United States Patent
Yao

(10) Patent No.: US 8,422,259 B2
(45) Date of Patent: Apr. 16, 2013

(54) SWITCH-MODE POWER SUPPLY AND APPARATUS FOR COMPENSATING INDUCTOR CURRENT PEAK

(75) Inventor: Yunlong Yao, Hangzhou (CN)

(73) Assignee: Hangzhou Silan Microelectronics Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 13/360,428

(22) Filed: Jan. 27, 2012

(65) Prior Publication Data

US 2012/0155121 A1   Jun. 21, 2012

Related U.S. Application Data

(63) Continuation of application No. PCT/CN2010/077055, filed on Sep. 17, 2010.

(30) Foreign Application Priority Data

Dec. 31, 2009  (CN) .......................... 2009 1 0156999

(51) Int. Cl.
   *H02M 7/537* (2006.01)
(52) U.S. Cl.
   USPC .................... 363/97; 363/21.09; 363/21.17
(58) Field of Classification Search .................. 323/283, 323/285; 363/21.01, 21.05, 21.09, 21.13, 363/21.17, 97
   See application file for complete search history.

(56) References Cited

U.S. PATENT DOCUMENTS

| | | | | |
|---|---|---|---|---|
| 7,772,823 | B2* | 8/2010 | Blanken | 323/284 |
| 2007/0041228 | A1 | 2/2007 | Fang et al. | |
| 2007/0091651 | A1 | 4/2007 | Jang | |
| 2008/0291700 | A1 | 11/2008 | Huang et al. | |
| 2011/0241642 | A1* | 10/2011 | Xi | 323/285 |
| 2012/0155121 | A1* | 6/2012 | Yao | 363/21.12 |

FOREIGN PATENT DOCUMENTS

| CN | 1917322 A | 2/2007 |
|---|---|---|
| CN | 101257256 A | 9/2008 |
| CN | 101777848 A | 7/2010 |

* cited by examiner

*Primary Examiner* — Jeffrey Sterrett
(74) *Attorney, Agent, or Firm* — Birch, Stewart, Kolasch & Birch, LLP

(57) ABSTRACT

A switch-mode power supply (SMPS) is provided. When the switch power of the SMPS turns on, the inductor current of the SMPS may flow through an inductor current sensing circuit which then provides a sensing voltage. An apparatus for compensating the inductor current peak receives a reference voltage and the sensing voltage as inputs and outputs a compensation voltage. The compensation voltage is combined with the reference voltage and/or the sensing voltage and is provided to a first comparator. The result keep $7t$ as $7s$ is provided to the logic control circuit coupled to the gate of the power switch after being driven by a driver circuit. The actual inductor current peak is kept identical with the reference current, which effectively controls the inductor current peak, thereby protecting the SMPS.

11 Claims, 9 Drawing Sheets

SWITCH-MODE POWER SUPPLY AND APPARATUS FOR COMPENSATING INDUCTOR CURRENT PEAK

CROSS REFERENCE TO RELATED APPLICATIONS

This application is a Continuation of PCT International Application No. PCT/CN2010/077055 filed on Sep. 17, 2010, which claims priority under 35 U.S.C. §119(a) to Patent Application No. 200910156999.8 filed in China on Dec. 31, 2009, all of which are hereby expressly incorporated by reference into the present application.

FIELD OF THE INVENTION

The present disclosure relates to switch-mode power supply (SMPS) technology, and more specifically, to technology for compensating SMPS inductor current peak.

BACKGROUND

Conventional fly-back switch-mode power supply (SMPS), as shown in FIG. 1, includes a comparator, a logic control circuit, a driver circuit, a power switch and an inductor current sensing circuit. The inductor current of the SMPS is fed into the drain of the power switch and the source of the power switch is coupled to the inductor current sensing circuit. When the power switch turns on, the inductor current of the SMPS flows through the inductor current sensing circuit which provides a sensing voltage. The comparator compares the sensing voltage with a reference voltage. The output of the comparator is coupled to the logic control circuit. After being driven by the driver circuit, the output of the logic control circuit controls the gate of the power switch.

Generally, the inductor current of the SMPS, as illustrated in FIG. 1, is a slope current. Once the inductor current reaches a predetermined reference current level, the output of the comparator inverts and the power switch takes an action. Since there is a delay from the inversion of the comparator's output to the action taken by the power switch, a difference may occur between an actual inductor current turn-off value and the predetermined reference current. The difference is associated with the delay time of the power switch and the up-slope of the inductor current, while the up-slope of the inductance current is associated with a voltage drop across the inductor and the inductance of the inductor. In the case of a constant reference current, the actual inductor current peak may vary as the up-slope of the inductor current varies.

A waveform of the inductor current is illustrated in FIG. 2. By virtue of a sampling resistor R1, the inductor current I1 is converted into a sensing voltage $V_{sense}$ which is then compared with the reference voltage VR. The reference current for the inductor current peak can be set as:

$$I_{pk0} = \frac{VR}{R1}.$$

The difference between the actual inductor current peak and the set reference current may be denoted as $\Delta I_{pk}$. The difference may be expressed as:

$$\Delta I_{pk} = \frac{V_L}{L} \cdot \Delta t_d \quad (1)$$

where $V_L$ denotes the voltage across the inductor, $\Delta t_d$ denotes a turn-off delay of the power switch, and L denotes the inductance of the inductor.

The actual inductor current peak is given as:

$$I_{pk} = I_{pk0} + \Delta I_{pk} \quad (2)$$

The conventional SMPS operates under a constant reference current. The inductor current peak of the SMPS may vary with the voltage drop across the inductor and the inductance of the inductor. As the inductor current peak flowing through the SMPS is no longer constant, the SMPS may be damaged due to over-current. Thus, there exists a need to effectively control the inductor current peak, thereby effectively controlling the output voltage, the output current or the output power.

SUMMARY

A switch-mode power supply is provided according to the present disclosure. The switch-mode power supply is able to automatically detect a difference between a reference current and an actual inductor current peak via an apparatus for compensating inductor current peak. The difference is then employed to compensate the reference voltage and/or sensing voltage so as to keep the actual inductor current peak being identical with the reference current. Consequently, the inductor current peak can be controlled effectively such that the switch-mode power supply is protected and the reliability and the consistency of the switch-mode power supply are enhanced.

An apparatus for compensating inductor current peak applicable to the switch-mode power supply is also provided according to the present invention.

The switch-mode power supply may include the apparatus for compensating inductor current peak, a first comparator, a logic control circuit, a driver circuit, a power switch, and an inductor current sensing circuit. When the power switch of the SMPS turns on, the inductor current of the SMPS may flow through the inductor current sensing circuit which in turn provides a sensing voltage. A reference voltage and the sensing voltage are fed into the apparatus for compensating inductor peak current which compares the reference voltage and the sensing voltage and outputs a compensation voltage. The compensation voltage is combined with the reference voltage and/or sensing voltage. The combined result is then output to the first comparator. According to the output of the apparatus for compensating inductor current peak, one of the three types of inputs is input to the input terminal of the first comparator: (1) compensated reference voltage and compensated sensing voltage; (2) compensated reference voltage and uncompensated sensing voltage; and (3) uncompensated reference voltage and compensated sensing voltage. The first comparator outputs its result to the logic control circuit. The output of the logic control circuit may control the gate of the power switch after being driven by the driver circuit. The source of the power switch is coupled to the inductor current sensing circuit. The inductor current of the switch-mode power supply is fed into the drain of the power switch.

The switch-mode power supply may further include a fourth switch coupled to the output terminal of the apparatus for compensating current peak. The fourth switch, under the control of a fourth switch control pulse signal, may preset the compensation voltage for the apparatus for compensating inductor current peak when the circuit is enabled, thereby realizing a soft start of the switch-mode power supply.

The apparatus for compensating inductor current peak may include a differential circuit and a compensating network. The reference voltage and the sensing voltage are fed into the differential circuit which compares the reference voltage and the sensing voltage and obtains a compensation voltage. The differential circuit may store the compensation voltage and outputs the compensation voltage to the compensating network. The compensating network combines the compensation voltage with the reference voltage and/or sensing voltage. The combined result is then output to the input terminal of the first comparator via the output terminal of the compensating network.

Further, the differential circuit may include a second comparator and a switch network. The input terminal of the second comparator is coupled to the output terminal of the compensating network. The second comparator outputs a first switch control pulse signal. Under the control of the first switch control pulse signal, a first switch in the switch network turns on and a bias current charges a first capacitor in the switch network. Then, a third switch control pulse signal controls a third switch in the switch network to turn on. The charges on the first capacitor in the switch network and the charges on a second capacitor in the switch network are distributed therebetween. The voltage across the second capacitor is the compensation voltage which is supplied to the compensating network. The switch network may further include a second switch. The second switch may remove the charges on the first capacitor under the control of the second switch control pulse signal.

Further, the compensating network may be implemented with adder/subtractor according to one of the following manners: (1) inputting both of the sensing voltage and the compensation voltage to a first adder/subtractor and a second adder/subtractor for calculation, where the result from the first adder/subtractor together with the reference voltage is fed into the input terminal of the first comparator, and the result from the second adder/subtractor together with the reference voltage is fed into the input terminal of the second comparator; (2) inputting both of the reference voltage and the compensation voltage to the adder/subtractor for calculation, wherein the result from the first adder/subtractor together with the sensing voltage is fed into the input terminal of the first comparator and the result from the second adder/subtractor together with the sensing voltage is fed into the input terminal of the second comparator; (3) inputting all of the sensing voltage, the reference voltage and the compensation voltage to the first adder/subtractor and the second adder/subtractor for calculation. The calculation result is provided to the input terminals of the first comparator and the second comparator, respectively.

The compensating network may further include a voltage/current conversion circuit. The compensation voltage is processed by the voltage/current conversion circuit before it reaches the adder/subtractor.

The switch-mode power supply calculates the compensation voltage automatically after one or more periods.

The switch-mode power supply is not only able to compensate the maximum of the inductor current, but also to compensate the minimum of the inductor current.

According to the present disclosure, the switch-mode power supply as well as the apparatus for compensating the inductor current peak are able to automatically detect a difference between a reference current and an actual inductor current peak. The difference is then employed to compensate the reference voltage and/or sensing voltage so as to keep the actual inductor current peak being identical with the reference current. Consequently, the inductor current peak can be controlled effectively such that the switch-mode power supply is protected and the reliability and the consistency of the switch-mode power supply are enhanced. Meanwhile, the switch-mode power supply according to the present disclosure may further realize a soft start based on the apparatus for compensating inductor current peak such that the apparatus for compensating the inductor current peak and the soft-start apparatus can be shared, thereby reducing the area of switch power and saving the cost.

BRIEF DESCRIPTION OF THE DRAWINGS

Features, characteristics of the present disclosure will become apparent from the following embodiments when taken in conjunction with the drawings, in which.

PREFERRED EMBODIMENT OF THE PRESENT INVENTION

Illustrations are made to the present disclosure in connection with the accompanying drawings.

Figure 1:
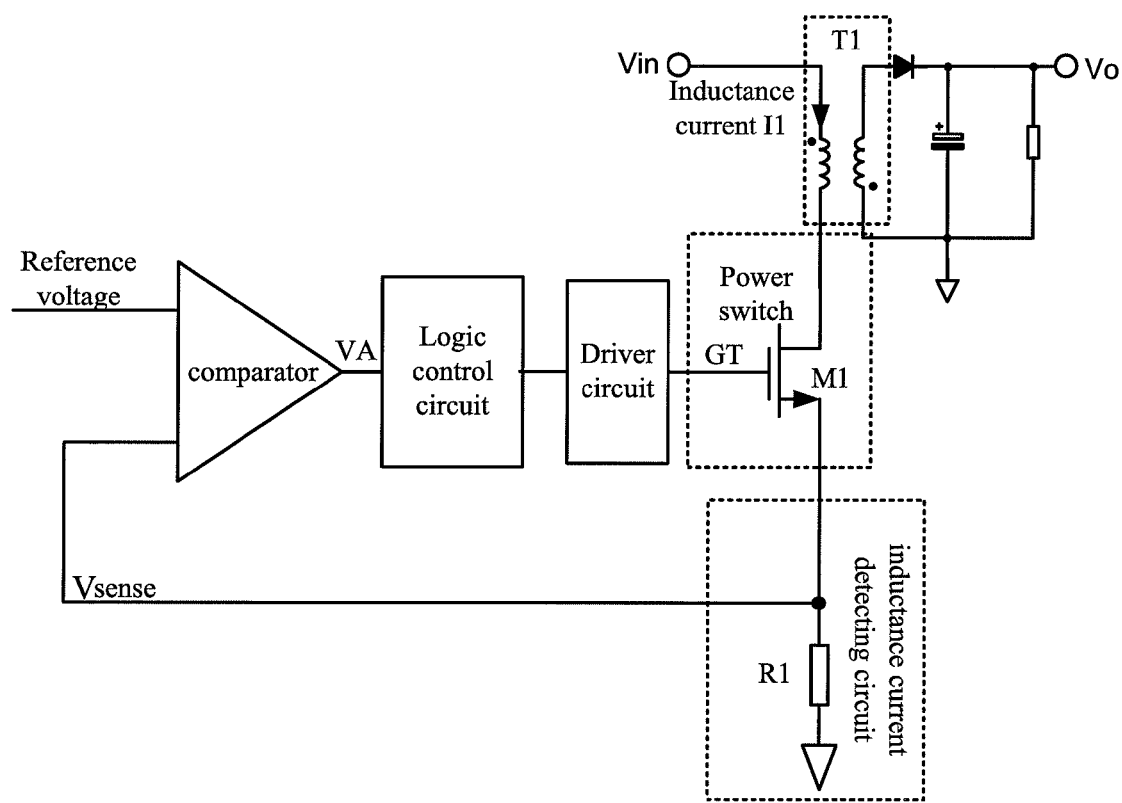
FIG. 1 illustrates a schematic of a conventional switch-mode power supply.
Figure 2:
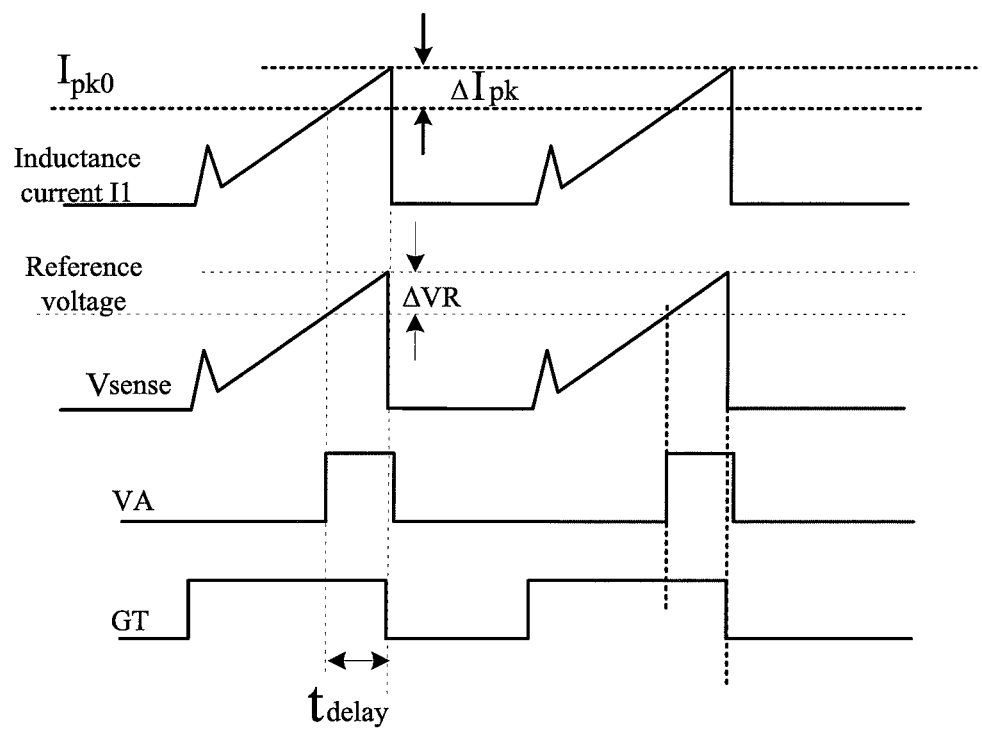
FIG. 2 illustrates a conventional inductor current waveform.
Figure 3:
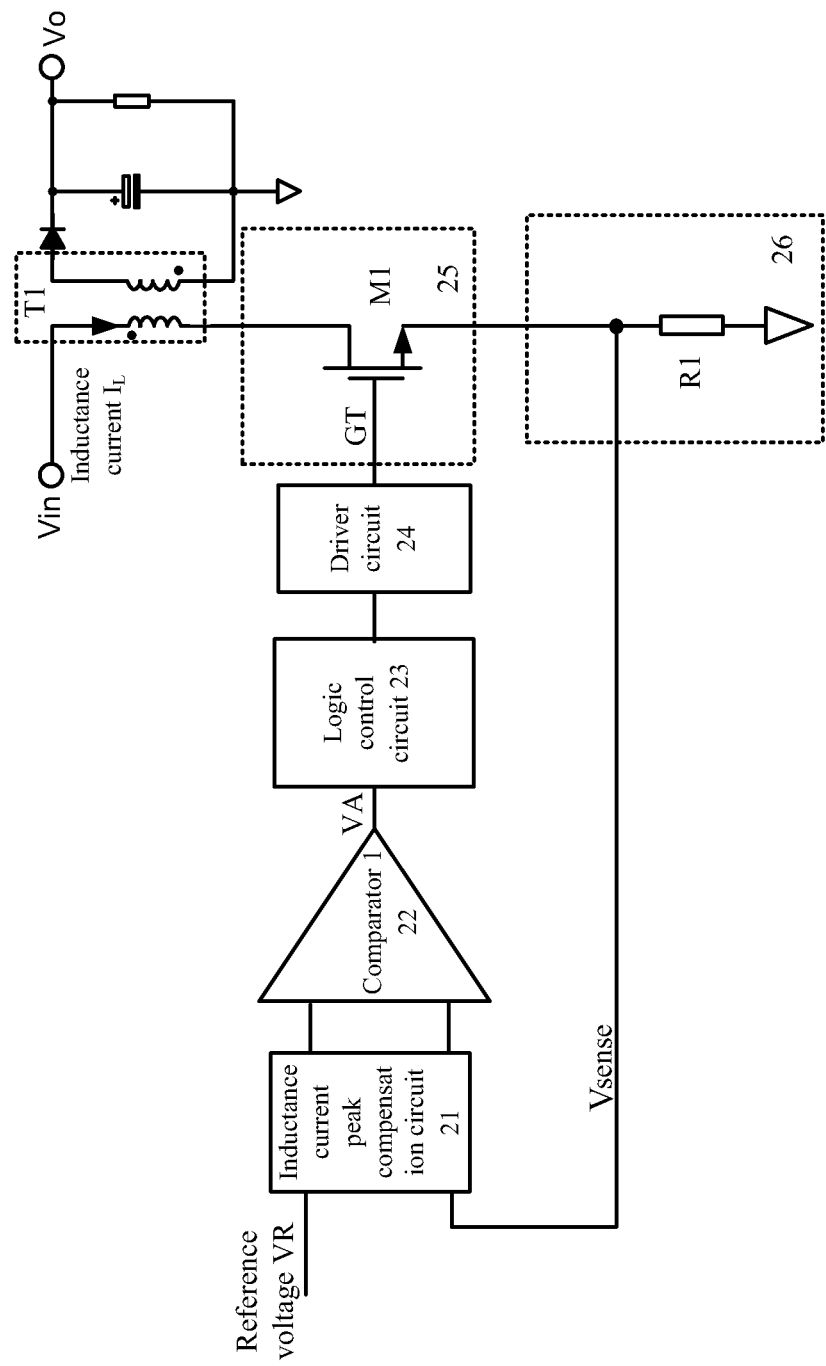
FIG. 3 illustrates a schematic of a switch-mode power supply according to one embodiment of the present disclosure.

FIG. 3 illustrates an example of the switch-mode power supply (SMPS). The SMPS includes an apparatus for compensating inductor current peak 21, a first comparator 22, a logic control circuit 23, a driver circuit 24, a power switch 25, and an inductor current sensing circuit 26.

When the power switch 25 of the SMPS turns on, the inductor current $I_L$ of the SMPS may flow through the inductor current sensing circuit 26 which then provides a sensing voltage $V_{sense}$.

A reference voltage VR and the sensing voltage $V_{sense}$ are fed into the apparatus for compensating inductor current peak 21 which compares the reference voltage VR and the sensing voltage $V_{sense}$ and outputs a compensation voltage. The compensation voltage is combined with the reference voltage and/or sensing voltage. The combined result is then output to the first comparator 22.

Depending on the output of the apparatus for compensating inductor current peak 21, the input terminal of the first comparator 22 receives one of the following inputs:

(1) the compensated reference voltage and the compensated sensing voltage;

(2) the compensated reference voltage and the uncompensated sensing voltage; and (3) the uncompensated reference voltage and the compensated sensing voltage.

The first comparator 22 outputs its result to the logic control circuit 23. The output of the logic control circuit 23 may control the gate (GT) of the power switch 25 after the output is driven by the driver circuit 24. Furthermore, the source of the power switch 25 is coupled to the inductor current sensing circuit 26. The inductor current $I_L$ of the SMPS is fed into the drain of the power switch 25.

Figure 4:
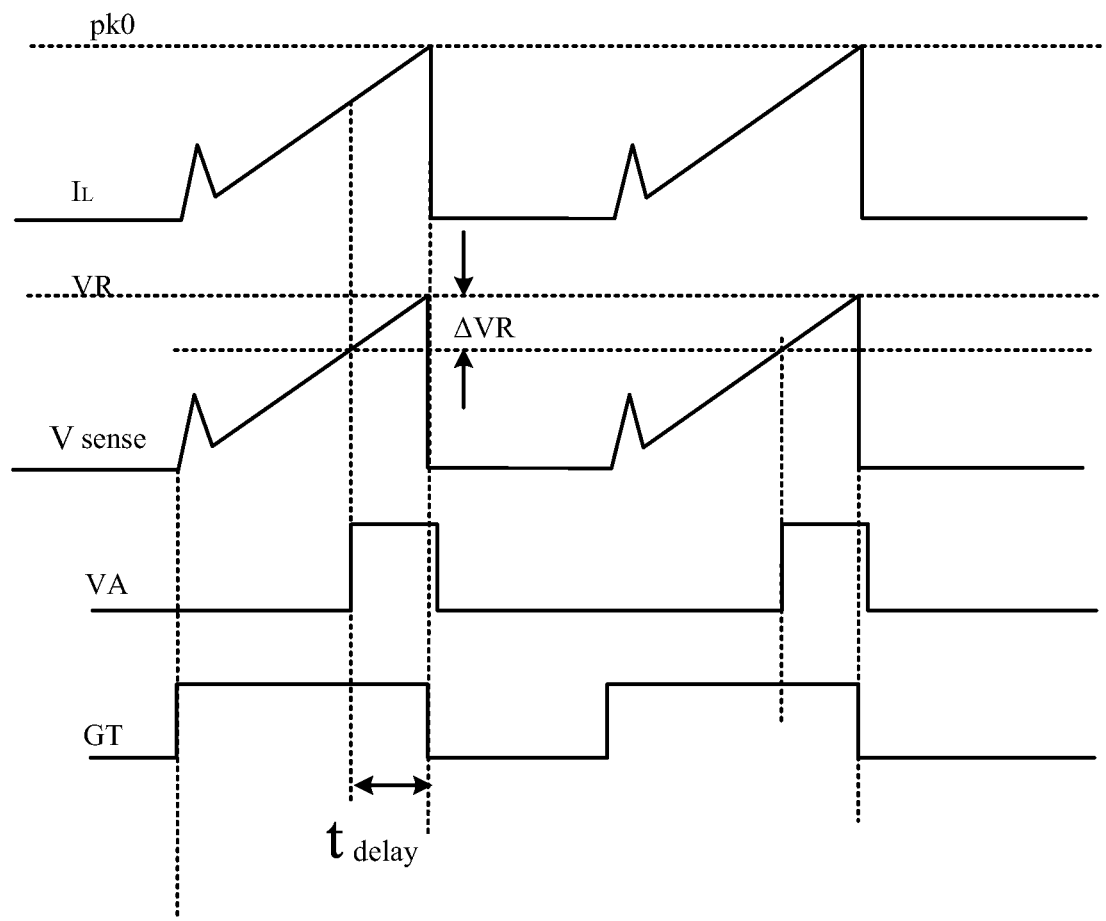
FIG. 4 illustrates an inductor current waveform according to one embodiment of the present disclosure.

After the SMPS, as shown in FIG. 3, is compensated by the apparatus for compensating inductor current peak 21, the SMPS outputs the inductor current whose waveform is illustrated in FIG. 4.

Figure 5:
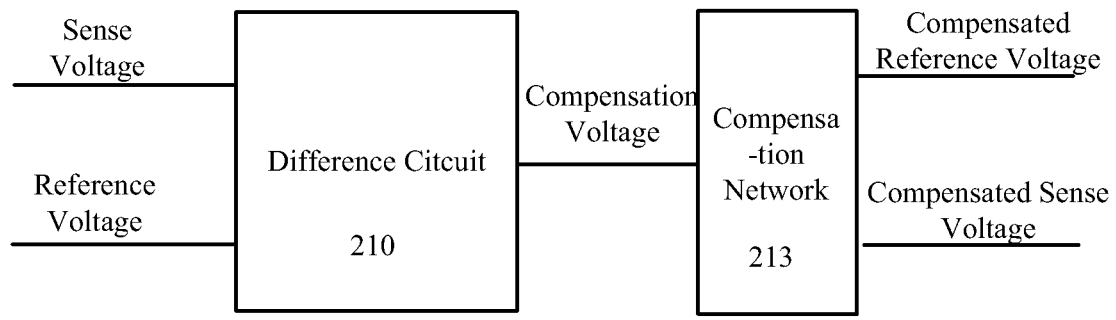
FIG. 5, FIG. 6, FIG. 7, and FIG. 8 illustrate block diagrams of an apparatus for compensating inductor current peak according to embodiments of the present disclosure.

FIG. 5 illustrates an exemplary structure for the apparatus for compensating inductor current peak 21. The apparatus includes a differential circuit 210 and a compensating network 213.

The differential circuit 210 receives the foregoing reference voltage VR and the sensing voltage $V_{sense}$ as inputs, compares them and outputs a compensation voltage, which is saved and output to the compensating network 213.

The compensating network 213 combines the compensation voltage with the reference voltage and/or sensing voltage. The combined result is then output to the input terminal of the first comparator 22 via the output terminal of the compensating network 213.

Figure 9:
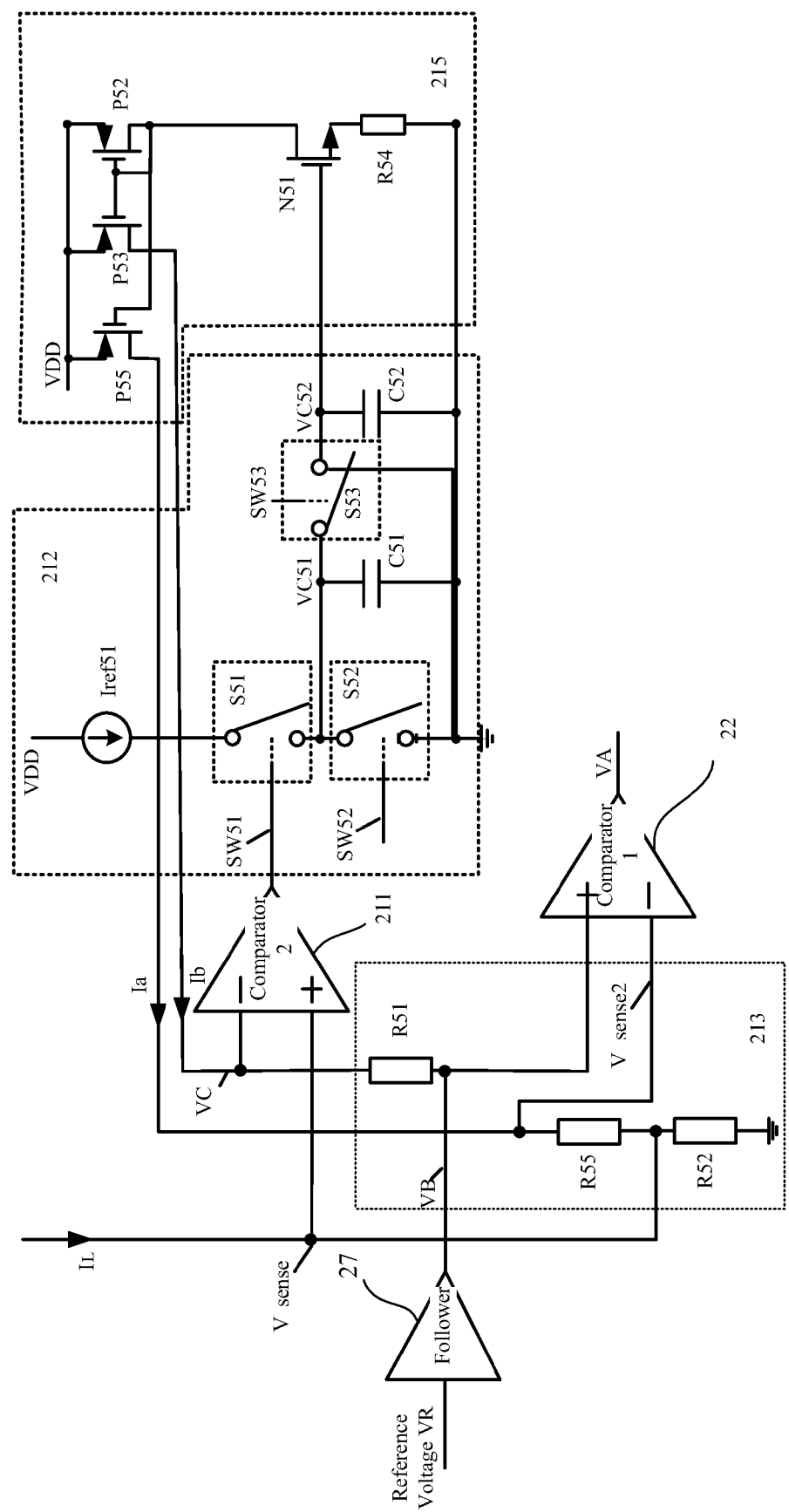
FIG. 9 illustrates a schematic for an apparatus for compensating inductor current peak according to one embodiment of the present disclosure.
Figure 11:
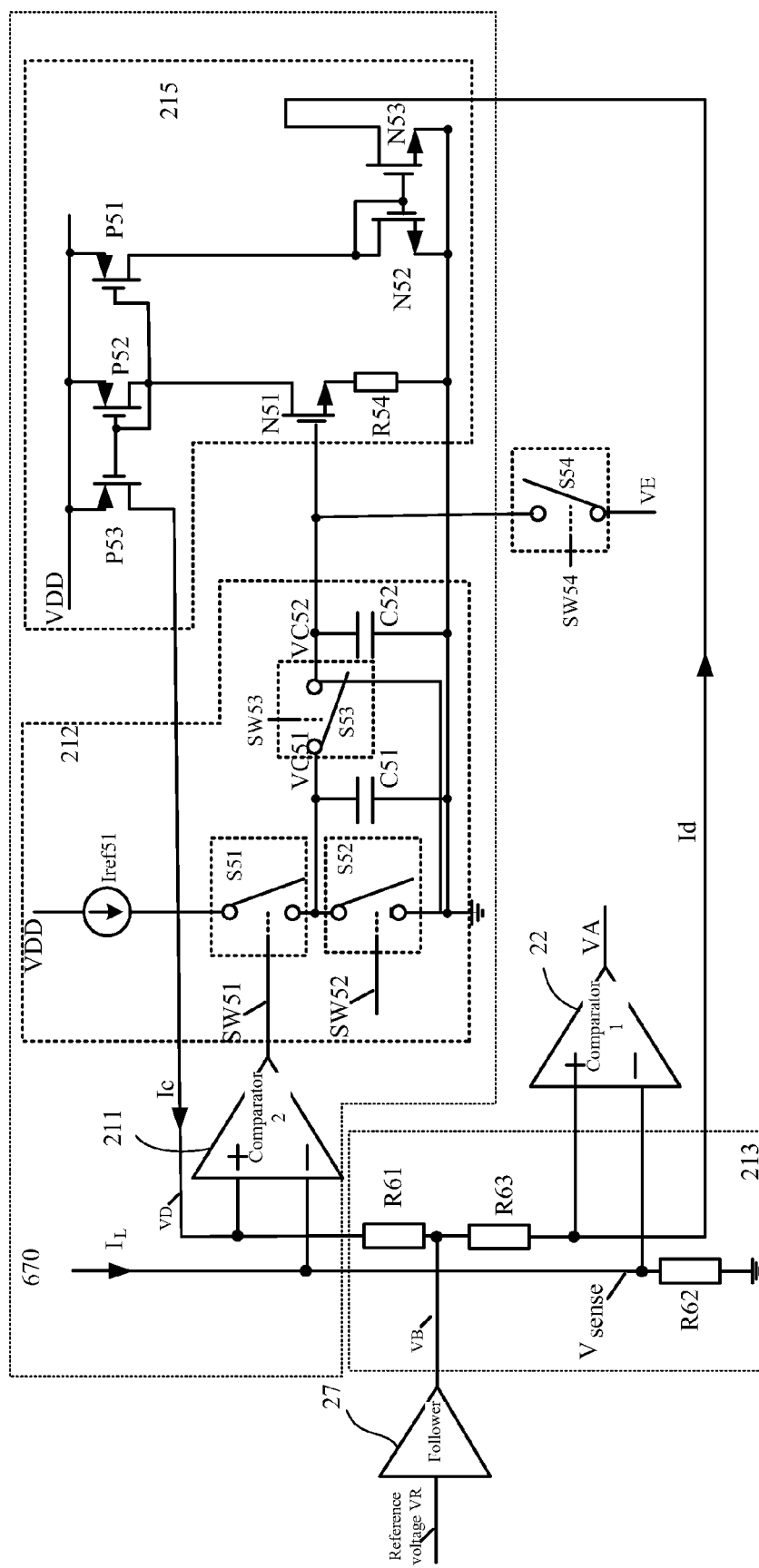
FIG. 11 illustrates a schematic for an apparatus for compensating inductor current peak according to another embodiment of the present disclosure.

Further, the differential circuit 210, as shown in FIG. 9 and FIG. 11, may include a second comparator 211 and a switch network 212.

The input terminal of the second comparator 211 is coupled to the output terminal of the compensating network 213. The second comparator 211 outputs a first switch control pulse signal SW51. Under the control of the first switch control pulse signal SW51, a first switch S51 in the switch network 212 turns on and a bias current charges a first capacitor C51 in the switch network 212. Then, a third switch control pulse signal may control the turn-on of a third switch S53 in the switch network 212 and the distribution of the charges on the first capacitor C51 in the switch network 212 and the charges on the second capacitor C52 in the switch network 212. The voltage across the second capacitor C52 is the compensation voltage which is supplied to the compensating network 213.

The switch network 212 may further include a second switch S52 which removes the charges on the first capacitor C51 under the control of the second switch control pulse signal.

Figure 7:
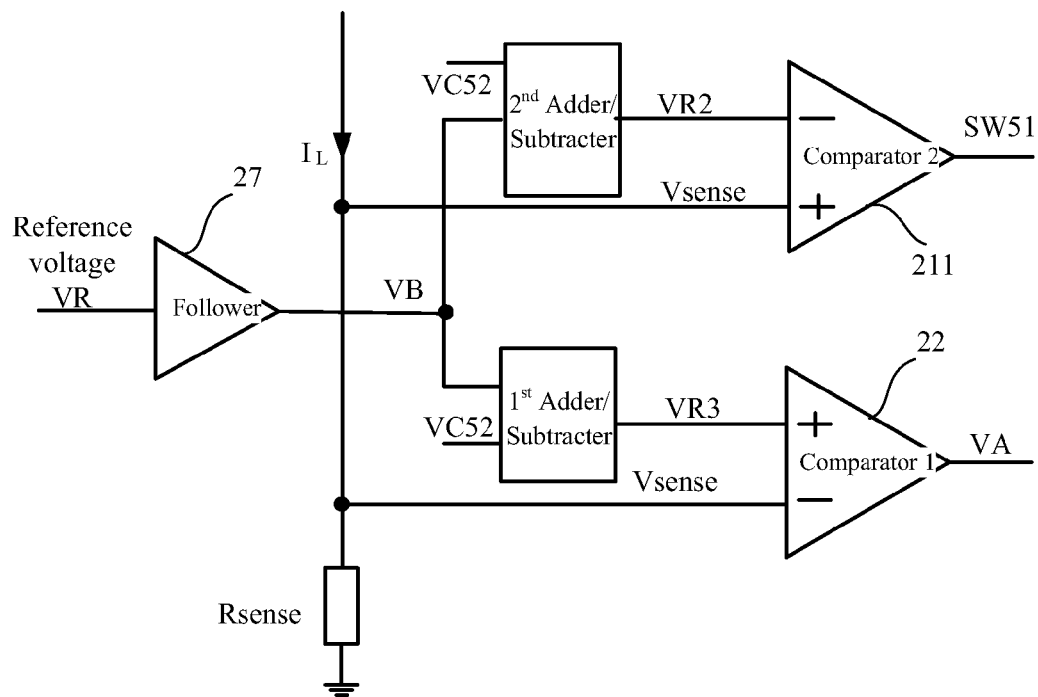
Figure 8:
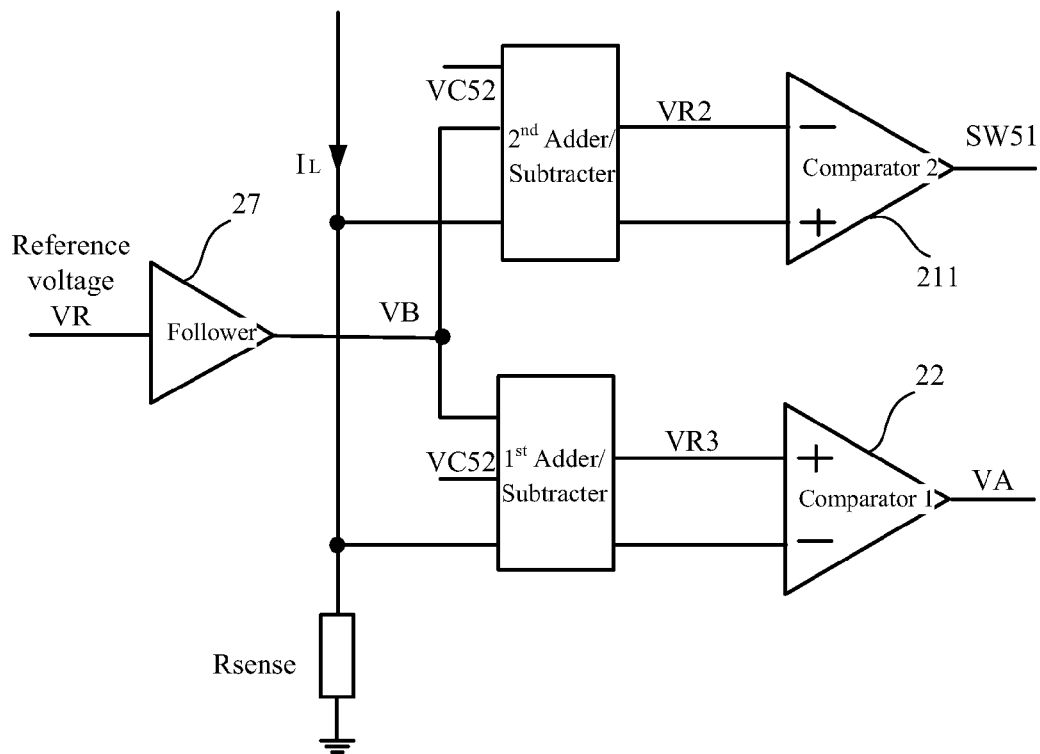

In addition, the compensating network 213 may be implemented with adder/subtractor according to one of the following manners:

(1) Both of the sensing voltage $V_{sense}$ and the compensation voltage VC52 are fed into a first adder/subtractor and a second adder/subtractor for calculation. The result from the first adder/subtractor together with the reference voltage VR is fed into the input terminal of the first comparator 22. The result from the second adder/subtractor together with the reference voltage VR is fed into the input terminal of the second comparator 211, as shown in FIG. 6;

(2) Both of the reference voltage VR and the compensation voltage VC52 are fed into adder/subtractors for calculation. The result from the first adder/subtractor together with the sensing voltage $V_{sense}$ is fed into the input terminal of the first comparator 22. The result from the second adder/subtractor together with the sensing voltage $V_{sense}$ is fed into the input terminal of the second comparator 211, as shown in FIG. 7;

(3) All of the sensing voltage $V_{sense}$ the reference voltage VR and the compensation voltage VC52 are fed into the first adder/subtractor and the second adder/subtractor for calculation. The result is provided to the input terminals of the first comparator 22 and the second comparator 211, respectively, as shown in FIG. 8.

Figure 6:
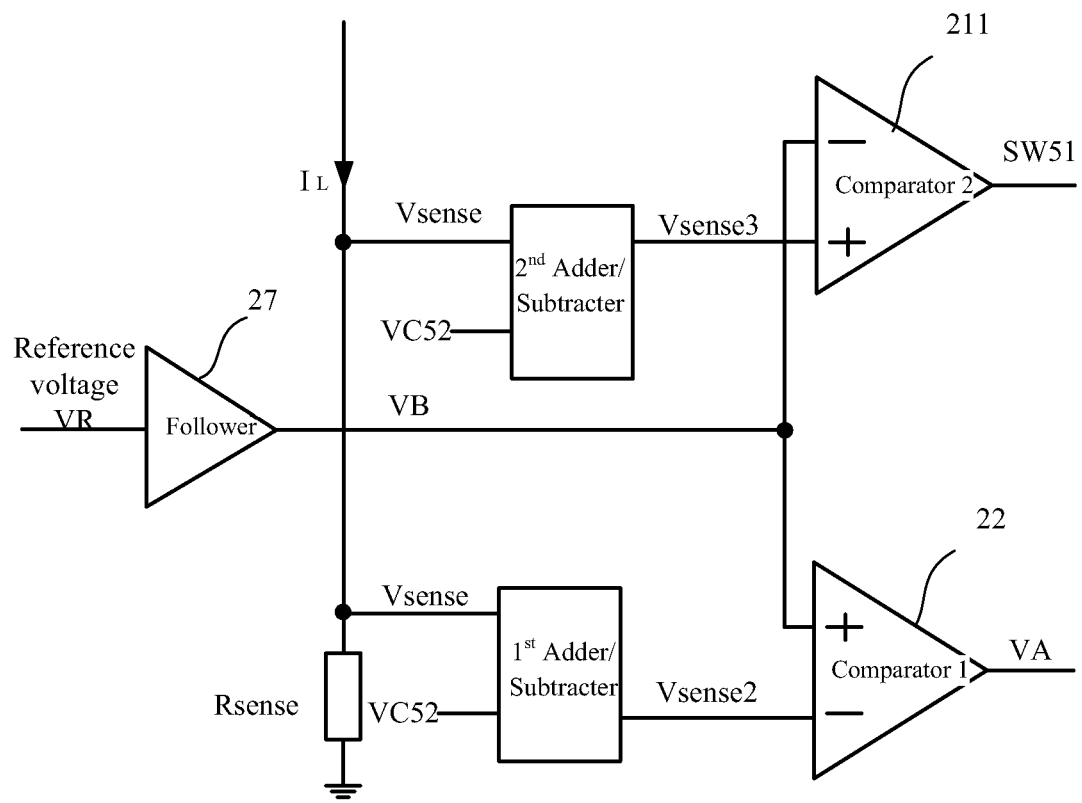

Take FIG. 6 as an example, Vsense2=Vsense+K1*VC52, Vsense3=Vsense−K2*VC52, where K1 and K2 are coefficients.

For simplicity, let K1=K2=1. After the circuit achieves balance, the following equation is obtained:

$$Ipk*Rsense-K2*VC52=Vsense3=VB$$

That is, Ipk=(VB+K2*VC52)/Rsense

When K2=0, a full compensation is achieved.

When K2 is not zero, an under-compensation occurs.

When the first adder/subtractor is an adder, over-compensation occurs.

FIG. 9 and FIG. 11 illustrates specific embodiments of the apparatus for compensating inductor current peak. The compensating network 213 of this apparatus may further include a voltage/current conversion circuit 215. The compensation voltage will be processed by the voltage/current conversion circuit 215 before it reaches the adder/subtractor.

In the case where the reference voltage has a low drive capability, the reference voltage VR is input to a follower 27 which outputs a voltage VB.

The working principle of the apparatus for compensating inductor current peak as shown in FIG. 9 is that the voltage across the resistor R52 indicates a sampling voltage for the inductor circuit and the voltage across the resistor R55 indicates the compensation voltage. The voltage across the resistor R51 through which Ib flows compensates the voltage across the resistor R52 through which Ia flows.

After the circuit enters a steady status, the following relationship exists:

$$VC=VB+Ib*R51$$

$$Vsense=I_L*R52+Ia*R52$$

Thus, Ib*R51=Ia*R52.

When VC=Vsense, $I_L$=Ipk. As a result, Ipk=VB/R52.

The inductor current peak is fully determined by the reference voltage and the sampling resistor R52.

The compensation voltage across the resistor R55 may be adjusted automatically so as to ensure Ipk=VB/R52.

Figure 10:
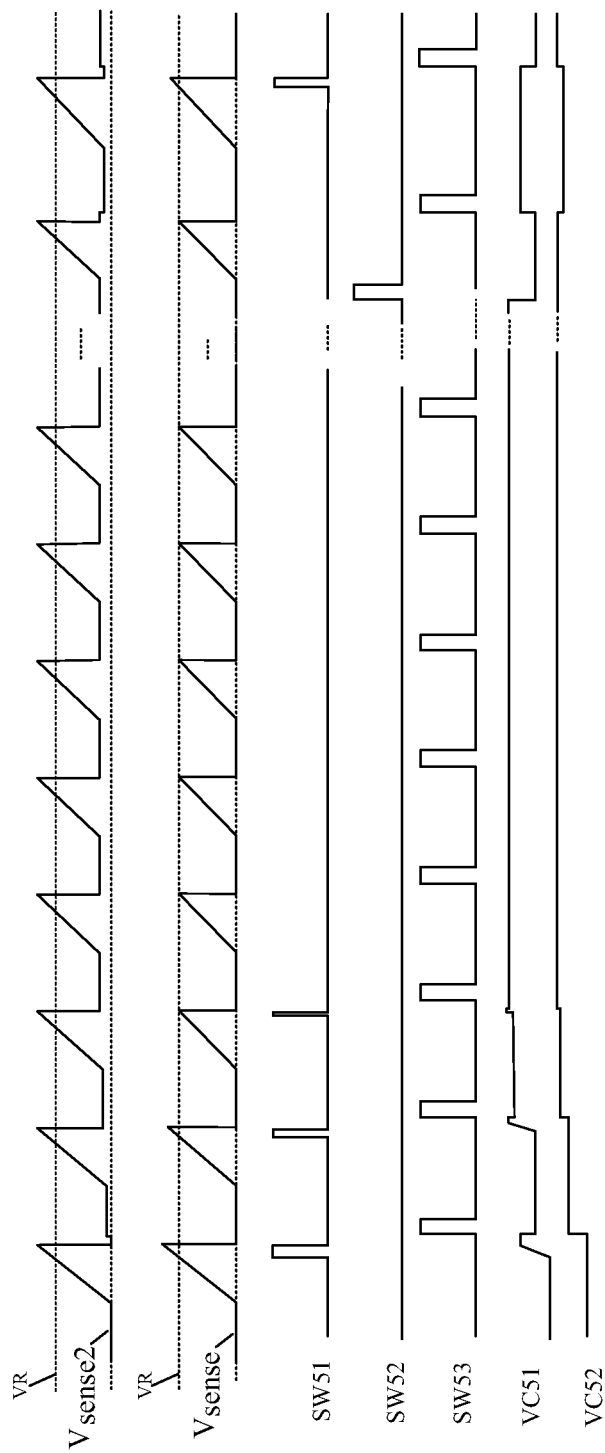
FIG. 10 illustrates waveforms of corresponding switch control signals and voltages at each point according to the present disclosure.

FIG. 10 illustrates a timing diagram of input signals associated with the apparatus for compensating inductor current peak. With reference to FIG. 9 and FIG. 10, the working process of the inductor current peak compensating circuit is illustrated as follows.

Assume that, initially, the voltage VC51 and the voltage VC52 are zero and there is no voltage across the resistors R55 and R51. Since Vsense2=Vsense+Ia*R55 and Vsense2=Vsense, the inductor current $I_L$ increases gradually. When the inductor current $I_L$ is less than the reference current, the output voltage VA of the first comparator 22 remains HIGH. When the inductor current $I_L$ is greater than the reference current, the output of the first comparator 22 inverts which causes the output voltage VA of the first comparator 22 to be LOW. With the control of logic control circuit and the driver circuit, the power switch turns off and the sensing voltage becomes small or drops to zero immediately. Due to a delay in the power switch taking an action, at the time that the inductor current peak Ipk exceeds the reference current and output of the first comparator inverts, the output of the second comparator is also inverted. The first switch signal SW51 is a high pulse which the causes the first switch S51 to turn on. The bias current flows through the first capacitor C51 so as to charge the first capacitor C51. Then, the third switch signal provides a high pulse signal which causes the third switch S53 to turn on, thereby transferring the charges on C51 to C52.

During a second period, the voltage VC52 is no longer zero. Thus, voltage drop is created across the resistors R51 and R55, wherein the voltage drop is used to compensate the sensing voltage. When the power switch turns on, the inductor current $I_L$ may increase gradually. The first comparator 22 may control the operation of the power switch. The second comparator 211 may control the operation of the first switch S51 according to VC and Vsense. In the case of insufficient compensation, the bias current may recharge the first capacitor C51. Then, the third switch SW3 turns on and the charges are transferred to the capacitor C52. As the voltage VC52 increases, and the amount of compensation increases. Voltage VC52 is converted into Ia and Ib via the voltage/current converter (V/I converter) 215.

By proper design of the bias current, the first charging capacitor C51 and the second charging capacitor C52, the desired number of on-off periods can be achieved for a full compensation on the inductor current.

By selecting the mirror ratio of the mirror current and the resistor ratio of resistor R51 to resistor R52, the amount of compensation can thus be determined for realizing full compensation, under-compensation and over-compensation.

Let Ib*R51=Ia*R52, full compensation is achieved.

Let Ib*R51>Ia*R52, under-compensation is achieved. That is, the value of the inductor current peak will not be fully compensated.

Let Ib*R51<Ia*R52, over-compensation is achieved. That is, the inductor current peak is overly compensated, which exceeds the desired amount of compensation.

FIG. 10 illustrates control waveforms for each point as shown in FIG. 9 according to one embodiment. The amount of compensation is automatically calculated after a couple of periods. After several periods, the switch S52 turns on once and the amount of compensation is re-calculated.

FIG. 11 illustrates an apparatus for compensating inductor current according to another embodiment. The principle of FIG. 11 is almost the same as that of FIG. 9 except that the compensating network and the V/I converter are slightly changed. The working process is the same as that of FIG. 10.

After the circuit enters a steady status, the following relation is obtained:

$$VD=VB+Ic*R61$$

$$V\text{sense}=I_L*R62$$

Let R61=0. When the inductor current peak of the circuit is fully compensated, the following equation is obtained: VD=Vsense, where $I_L$=Ipk, i.e., Ipk=VB/R62.

The inductor current peak is fully determined by the reference voltage and the sampling resistor.

The compensation voltage across the resistor R63 may be adjusted automatically so as to ensure Ipk=VB/R62.

When R61 is not zero, the under-compensation occurs.

The SMPS as shown in FIG. 9 and FIG. 11 may further include a fourth switch S54 coupled to the output terminal of the apparatus for compensating current peak 21. The fourth switch S54, under the control of the fourth switch control pulse signal SW54, may preset the compensation voltage for the apparatus for compensating inductor current peak 21 when the circuit is enabled, thereby realizing a soft start of the SMPS.

According to embodiments of the present invention, a method and an apparatus for compensating comparison point of the SMPS's inductor current peak comparator are disclosed. Detailed embodiments and effects of the present invention are described in conjunction with the drawings. It is appreciated that the foregoing embodiments are only illustrative. The present invention is not intended to be limiting in these respects. Any modification conceived without departing from the scope of the present invention, including a modification to the circuit for generating/maintaining the difference between the inductor current and the reference current, a modification to the compensating network, a partial modification to the timing of the control signals, a change to parts of the circuit, a replacement of the type or model of any component as well as other non-substantial replacement or variation, shall be construed as falling within the scope of the present invention.

What is claimed is:

1. A switch-mode power supply, comprising an apparatus for compensating inductor current peak, a first comparator, a logic control circuit, a driver circuit, a power switch, and an inductor current sensing circuit;

wherein when the power switch turns on, the inductor current of the switch-mode power supply flows through the inductor current sensing circuit which provides a sensing voltage;

the apparatus for compensating inductor current peak comprises a differential circuit and a compensating network; the differential circuit receives a reference voltage and the sensing voltage as inputs and compares the reference voltage and the sensing voltage to obtain a compensation voltage; the differential circuit stores the compensation voltage and outputs the compensation voltage to the compensating network; the compensating network combines the compensating voltage with the reference voltage and/or the sensing voltage and outputs a combined result to the first comparator;

a comparison result of the first comparator is provided to the logic control circuit, an output of the logic control circuit is coupled to a control terminal of the power switch after the output is driven by the drive circuit; the first terminal of the power switch is coupled to the inductor current sensing circuit and the second terminal of the power switch receives the inductor current of the switch-mode power supply as an input.

2. The switch-mode power supply of claim 1, wherein the compensating network of the apparatus for compensating inductor current peak is implemented with adder/subtractor by one of the following manners:

inputting both of the sensing voltage and the compensation voltage to the adder/subtractor for calculation;

inputting both of the reference voltage and the compensation voltage to the adder/subtractor for calculation; and inputting all of the sensing voltage, the reference voltage and the compensation voltage to the adder/subtractor for calculation;

and the above calculation result is provided to the input terminals of the first comparator and the second comparator.

3. The switch-mode power supply of claim 1, wherein the differential circuit of the apparatus for compensating inductor current peak comprises a second comparator and a switch network, wherein an input terminal of the second comparator is coupled to an output terminal of the compensating network; the second comparator outputs a first switch control pulse signal; under the control of the first switch control pulse signal, a first switch in the switch network turns on and a bias current charges a first capacitor in the switch network; then, a third switch control pulse signal controls a third switch in the switch network to turn on and the charges on the first capacitor and a second capacitor in the switch network are distributed therebetween; a voltage across the second capacitor is provided to the compensating network.

4. The switch-mode power supply of claim 3, wherein the compensating network further comprises a voltage/current conversion circuit and the compensation voltage is processed by the voltage/current conversion circuit before it reaches the adder/subtractor.

5. The switch-mode power supply of claim 3, wherein the switch network further comprises a second switch which removes the charges on the first capacitor under the control of a second switch control pulse signal.

6. The switch-mode power supply of claim 1, wherein the switch-mode power supply further includes a fourth switch coupled to an output terminal of the apparatus for compensating inductor current peak; and the fourth switch, under the control of a fourth switch control pulse signal, presets the compensation voltage for the apparatus for compensating inductor current peak when the circuit is enabled, thereby realizing a soft start of the switch-mode power supply.

7. The switch-mode power supply of claim 6, wherein the compensating network of the apparatus for compensating inductor current peak is implemented with adder/subtractor by one of the following manners:
  inputting both of the sensing voltage and the compensation voltage to the adder/subtractor for calculation;
  inputting both of the reference voltage and the compensation voltage to the adder/subtractor for calculation; and
  inputting all of the sensing voltage, the reference voltage and the compensation voltage to the adder/subtractor for calculation;
  and the above calculation result is provided to the input terminals of the first comparator and the second comparator.

8. The switch-mode power supply of claim 6, wherein the differential circuit of the apparatus for compensating inductor current peak comprises a second comparator and a switch network,
  wherein an input terminal of the second comparator is coupled to an output terminal of the compensating network; the second comparator outputs a first switch control pulse signal; under the control of the first switch control pulse signal, a first switch in the switch network turns on and a bias current charges a first capacitor in the switch network; then, a third switch control pulse signal controls a third switch in the switch network to turn on and the charges on the first capacitor and a second capacitor in the switch network are distributed therebetween; a voltage across the second capacitor is provided to the compensating network.

9. An apparatus for compensating inductor current peak, comprising a differential circuit and a compensating network,
  the differential circuit receives a reference voltage and a sensing voltage as inputs, compares them and outputs a compensation voltage, the differential circuit stores the compensation voltage and outputs the compensation voltage to the compensating network;
  the compensating network combines the compensation voltage with the reference voltage and/or sensing voltage, the combined result is then output to an input terminal of a first comparator.

10. The apparatus for compensating inductor current peak of claim 9, wherein the differential circuit comprises a second comparator and a switch network,
  wherein an input terminal of the second comparator is coupled to an output terminal of the compensating network; the second comparator outputs a first switch control pulse signal; under the control of the first switch control pulse signal, a first switch in the switch network turns on and a bias current charges a first capacitor in the switch network; then a third switch control pulse signal controls a third switch in the switch network to turn on and the charges on the first capacitor and a second capacitor in the switch network are distributed therebetween; a voltage across the second capacitor is provided to the compensating network.

11. The apparatus for compensating inductor current peak of claim 10, wherein the compensating network is implemented with adder/subtractor by one of the following manners:
  inputting both of the sensing voltage and the compensation voltage to the adder/subtractor for calculation;
  inputting both of the reference voltage and the compensation voltage to the adder/subtractor for calculation; and
  inputting all of the sensing voltage, the reference voltage and the compensation voltage to the adder/subtractor for calculation;
  and the above calculation result is provided to the input terminal of the second comparator.

* * * * *